April 7, 1970  G. E. NOE  3,505,053
GLASS STIRRING APPARATUS
Filed June 20, 1966
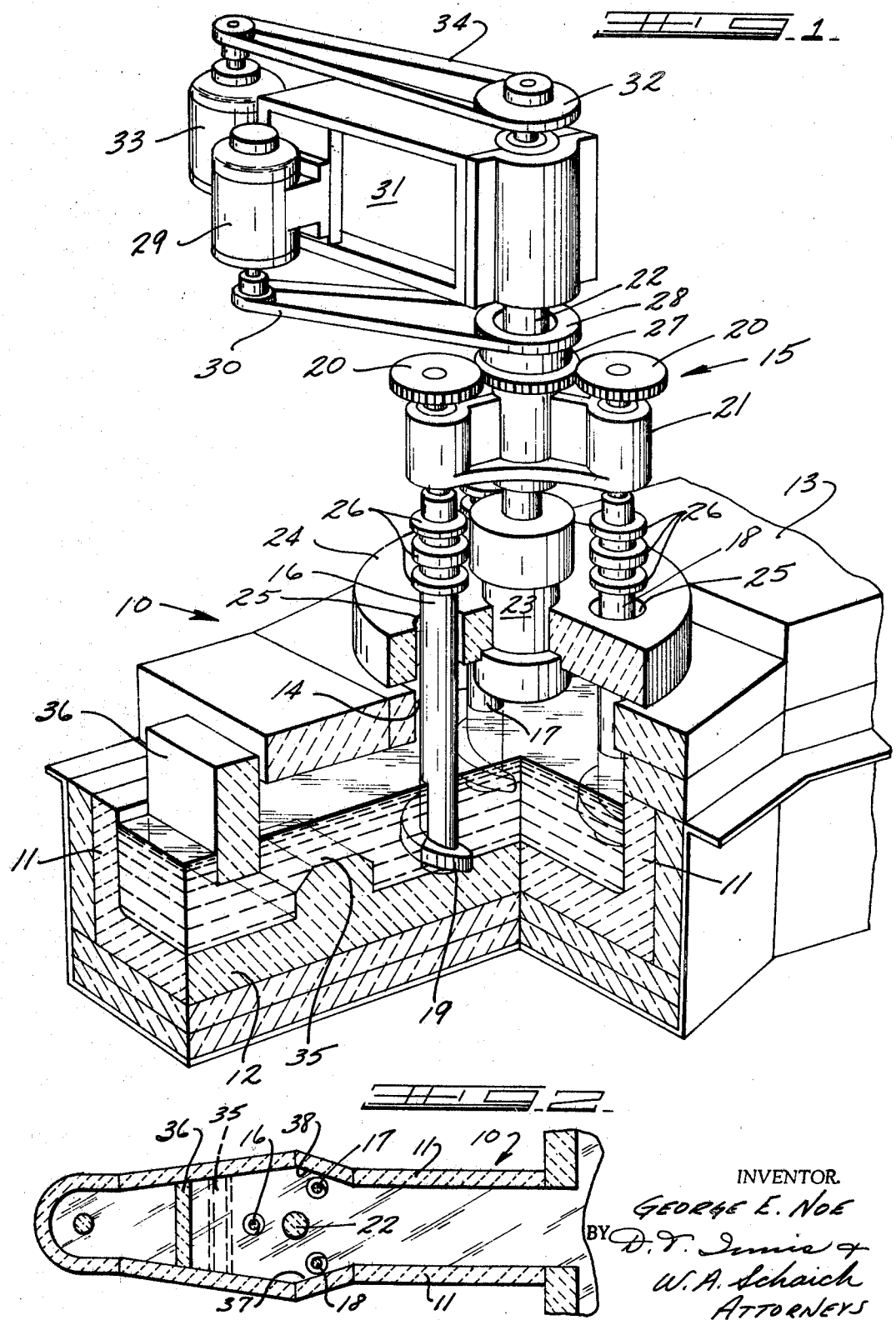
INVENTOR.
GEORGE E. NOE
BY
ATTORNEYS

United States Patent Office 3,505,053
Patented Apr. 7, 1970

3,505,053
GLASS STIRRING APPARATUS
George E. Noe, Toledo, Ohio, assignor to Owens-Illinois, Inc., a corporation of Ohio
Filed June 20, 1966, Ser. No. 558,647
Int. Cl. C03b 5/18
U.S. Cl. 65—178  1 Claim

ABSTRACT OF THE DISCLOSURE

In the blending of glass in a forehearth, a planetary stirrer apparatus using three stirrer elements, rotating individually about their axes at a selected speed, and also moving, as a whole, in a circular path at a different selected speed in a locally widened forehearth channel, to effectively break up stratification and promote thorough mixing of the glass. The particular apparatus effectively moves the colder glass away from the walls of the channel and mixes it with the hotter glass by reason of the rotation of the stirrers and also by the physical movement of the stirrers across the forehearth.

---

This invention relates to improvements in means and methods of stirring molten glass in a glass feeder forehearth or the like so as to obtain desirable uniformity of temperature color and composition of the glass passing to the feeder outlet or other point of utilization of the molten glass.

As is well known, those portions of a stream or body of molten glass flowing in a forehearth which are next to the bottom and side walls thereof, tend to be cooler and thus more viscous than the glass flowing through the center of the forehearth. As would be expected, the hotter glass flows more readily than the cooler glass, resulting in stratification and non-uniformity in temperature throughout the cross-section at any given place along the length of the forehearth.

Furthermore, the glass stream flowing in the forehearth may be inhomogeneous because of streaks of refractory-contaminated glass, colored frit, or due to glasses of different compositions or for other causes.

In view of the foregoing, it is an object of this invention to effectively break up stratification and promote more thorough mixing and blending of the glass in the forehearth at a predetermined place thus to provide approximate uniformity of temperature and viscosity of the glass at all levels in the stream, as well as more nearly produce homogeneous glass.

It has been the practice in the past to mount stirrers on fixed axes in relation to the side walls of the forehearth in an attempt to move the colder glass away from the walls and mix it with the hotter glass flowing down the center of the forehearth. One of the more serious problems involved in this sort of a system is that it is difficult to hold the flow of glass long enough so as to provide complete and thorough blending of the cold and hotter glass before permitting it to flow down the stream to the feeder.

A practical embodiment of the present invention involves the utilization of a plurality of stirrer elements which are rotated about their individual axes, while at the same time the stirrers are moved bodily into close proximity to the side walls of the forehearth by moving the individual stirrers from one side of the forehearth channel to the other side.

The stirrer elements themselves are of the submerged spiral, screw-thread type, well known in the art, which effectively pump glass upwardly or downwardly, depending upon the hand of the screw and direction of rotation thereof.

It has been applicant's experience that when the stirrer elements are fixed in relation to the forehearth channel, there is a tendency for the glass to flow past the stirrers without being effectively disturbed. This is particularly true when only two stirrers are utilized leaving a hot stream of glass flowing therebetween.

It has been necessary in some instances to have a series of stirrers located at different points along the length of the forehearth in an attempt to be certain that all of the glass is effectively blended.

Applicant has found that by providing, for example three stirrer elements, equi-spaced about a central axis with means for moving the individual axes of the stirrers in a circular pattern spanning substantially the full width of the forehearth, while at the same time rotating each individual stirrer in a particular direction, that it is possible to blend the glass in the forehearth in a superior manner.

Applicant has also found that by placing a submerged dam downstream of the stirrer elements, that movement of the stirrer elements in a circular pattern adjacent the dam provides an additional benefit with respect to blending of the glass.

Other objects and advantages of the invention will be apparent from the following description taken in conjunction with the annexed sheet of drawing, wherein:

FIG. 1 is a perspective view, partly in section, illustrating the stirrer apparatus of the invention in its relationship with a forehearth channel; and FIG. 2 is a plan view of the forehearth in FIG. 1 on a reduced scale, showing the contour of the forehearth channel, the dam, and the position of the stirrers in relation thereto.

With reference to the drawing, a portion of a feeder forehearth 10, equipped with the molten glass stirring and impelling means of the present invention, is shown.

The stirring mechanism of the invention is mounted on a suitable support (not shown) above the forehearth structure.

The forehearth itself is formed of side walls 11, bottom wall 12 and cover 13. The cover 13 is provided with a circular opening 14 through which the stirrer mechanism, generally designated 15, is adapted to project.

The stirrer mechanism, per se, is comprised of three implements 16, 17 and 18. Each implement is formed with spiral screw threads 19 at the lower ends thereof, with the spiral extending up the shaft of the implements a distance less than the normal level of the glass within the forehearth. In other words, the stirrers are intended to have their threaded ends totally immersed in the molten glass in the forehearth. Each stirrer is provided with a spur gear 20 at its upper end and each stirrer or implement 16–18 is mounted for rotation about its axis in the spider 21. The spider 21, as shown, is formed with three arms, each of which is adapted to rotatably support an implement or stirrer. The spider 21 is rotatably mounted on a central vertical shaft 22. The lower end of the shaft 22 carries a refractory spindle 23.

The spindle 23 is adapted to support a circular insulating block 24, with the diameter of the insulating block 24 being larger than the opening 14 formed in the cover 13 of the forehearth. The block 24 also is provided with three vertical passages 25 formed therein through which the implements 16–18 extend. With this particular arrangement of the insulating block, excessive heat loss through the opening 14 in the roof of the forehearth is prevented and radiation about the shafts of the implements 16–18 is prevented to a certain extent by the interposition of a series of baffles 26.

A central spur gear 27 is mounted coaxially with respect to the shaft 22 and is in engagement with the spur gear 20 on the upper ends of the implements 16–18. The spur gear 27 is integrally formed with a pulley 28, which pulley is driven by a motor 29 through belt 30. The motor 29 is supported on an upper support member 31, which support member also serves as the bearing support for the upper end of the shaft 22. A portion of the upper end of the shaft 22 extends above the support 31 and carries a pulley 32. The pulley 32 is rotated by a motor 33 through belt 34. The motor 33 also is mounted on the support member 31. It should be understood that both the motors 33 and 29 are connected to a suitable source of current and are of the type wherein their speed may be varied depending upon the control of the current flow thereto.

It can readily be seen that upon rotation of the pulley 32, connected to the shaft 22, the assembly of the three stirrers and insulating block 24 will be rotated about the axis of the shaft 22, moving the stirrer elements in a circular pattern wherein they will approach closely to the side walls 11 of the forehearth during their rotation.

Furthermore, by the operation of the motor 29, it can be seen that each individual stirrer element 16, 17 or 18 will be rotated about its individual axis.

Downstream of the stirrer mechanism 15, the floor of the forehearth is formed with a dam 35.

It can readily be seen that during the rotation of the stirrer elements as a body, each stirrer will pass in close proximity to the rearward side of the dam 35, thus providing further mixing in the area in advance of the dam. Downstream of the dam 35 there is provided a flow retarding, skimmer block 36 whose lower edge extends below the normal surface of the glass within the forehearth. Also, it should be kept in mind that the dam extends from the bottom to a height less than the normal height of the glass within the forehearth. The skimmer block serves as a flow retardant providing the glass in the forehearth with a somewhat longer residence time within the area influenced by the stirrer implements 16–18.

As shown schematically in FIG. 2, the side walls 11 of the forehearth 10 are provided with recessed areas 37 and 38 adjacent to or at the area where the stirrer mechanism 15 is located. Thus it can be seen that upon rotation of the stirrer mechanism 15, each of the stirrer elements 16, 17 and 18, during their rotation about the axis of the shaft 22, will move into and out of the recesses formed at 37 and 38. In this manner the glass flowing through the forehearth 10 reaches an area which is somewhat larger than the cross-sectional area of the rearward end of the forehearth, providing a situation in which the glass within the widened area may be pumped vertically to increase the homogeneity of the glass.

I claim:

1. Blending apparatus for a glass feeder forehearth or the like forming a flow channel for a stream of molten glass having side walls and a bottom, comprising spider means having a plurality of radial arms extending into close proximity to said side walls, a vertically disposed rotary shaft journaled in each of said arms, each of said shafts having an upwardly directed spiral stirring screw thread at its lower end, said spider being supported from a bearing disposed above flow channel, each of said stirring screw threads extending below the normal level of the stream of molten glass and the lower end thereof adjacent the said bottom, variable speed motor means for rotating said spider, and other variable speed motor means for rotating said stirrer shafts.

References Cited

UNITED STATES PATENTS

| 471,337 | 3/1892 | Humphreys | 259—102 |
| 2,217,182 | 10/1940 | Peiler | 65—178 XR |
| 2,237,957 | 4/1941 | Christensen et al. | 259—102 |
| 2,238,800 | 4/1941 | Mueller | 65—178 XR |
| 2,707,621 | 5/1955 | Peiler | 65—178 XR |

FRANK W. MIGA, Primary Examiner

U.S. Cl. X.R.

65—134, 179; 259—102